United States Patent
Milligan et al.

(10) Patent No.: US 7,464,260 B2
(45) Date of Patent: Dec. 9, 2008

(54) METHOD FOR ALTERNATIVELY ACTIVATING A REPLACEABLE HARDWARE UNIT

(75) Inventors: Charles H. Milligan, Wingdale, NY (US); Juergen Probst, Wildberg (DE)

(73) Assignee: International Business Machines Corporation, Armonk, NY (US)

( * ) Notice: Subject to any disclaimer, the term of this patent is extended or adjusted under 35 U.S.C. 154(b) by 449 days.

(21) Appl. No.: 11/156,934

(22) Filed: Jun. 20, 2005

(65) Prior Publication Data

US 2005/0268162 A1  Dec. 1, 2005

Related U.S. Application Data

(63) Continuation of application No. PCT/RP03/13073, filed on Dec. 20, 2002.

(51) Int. Cl.
G06F 13/00 (2006.01)
(52) U.S. Cl. ............................ 713/100; 713/1; 713/2; 710/8; 710/10
(58) Field of Classification Search ............. 713/1, 713/2, 100; 710/8–15
See application file for complete search history.

(56) References Cited

U.S. PATENT DOCUMENTS

| | | | |
|---|---|---|---|
| 5,553,144 A | 9/1996 | Almquist et al. ............... 380/25 |
| 5,598,577 A | 1/1997 | Overfield ................... 395/830 |
| 6,721,817 B1 * | 4/2004 | Khosrowpour ................ 710/8 |
| 6,820,157 B1 * | 11/2004 | Eide et al. ................... 710/303 |
| 6,871,239 B2 * | 3/2005 | Tanaka ......................... 710/8 |
| 6,886,072 B2 * | 4/2005 | Saruwatari et al. .......... 711/106 |
| 6,965,949 B1 * | 11/2005 | Erickson et al. ............... 710/8 |
| 6,993,643 B2 * | 1/2006 | Powell ........................ 713/1 |
| 7,213,083 B1 * | 5/2007 | Erickson et al. ............... 710/8 |
| 7,350,008 B2 * | 3/2008 | Borgatti et al. ............ 710/301 |
| 2002/0108009 A1 * | 8/2002 | Borgatti et al. ............ 710/303 |

FOREIGN PATENT DOCUMENTS

| | | | |
|---|---|---|---|
| WO | WO 01/75613 | 4/2000 | |
| WO | WO 2004/057477 | 7/2004 | ........ 12/6 |

OTHER PUBLICATIONS

"Single In-Line Memory Module Identification Method for Personal Computers," IBM Technical Disclosure Bulletin, vol. 36, No 9A. Sep. 1, 1993, pp. 31-32.

* cited by examiner

*Primary Examiner*—Abdelmoniem Elamin
(74) *Attorney, Agent, or Firm*—Arthur Ortega

(57) ABSTRACT

A method for alternatively activating, in a data processing system, a replaceable hardware unit and providing a predetermined set of functional capabilities for configuring the data processing system to allow selectively electronically enabling at least a subset of its functional capabilities. Initially a replaceable hardware unit is provided to the data processing system, then its type is determined. If the replaceable hardware unit is of a first type, the subset of functional capabilities to be electronically enabled is determined. Alternatively, if the replaceable hardware unit is of another type, the entire functional capabilities of the replaceable hardware unit are enabled.

7 Claims, 2 Drawing Sheets

METHOD FOR ALTERNATIVELY ACTIVATING A REPLACEABLE HARDWARE UNIT

The present application is a continuation of International Patent Application PCT/EP03/13073 filed Dec. 20, 2002 as a PCT application.

BACKGROUND OF THE INVENTION

1. Field of the Invention

The present invention generally relates to configurable data processing systems. Particularly, the present invention relates to a method for alternatively activating a replaceable hardware unit of a first or a second type, providing a predetermined set of functional capabilities to a data processing system, whereby said data processing system is being configured to allow selectively electronically enabling of at least a subset of said functional capabilities.

2. Description of the Related Art

While the multiple models, variations and capabilities of modern computers represent a wide variety of choices to the consumer, the concomitant requirement that multiple variations and models of such computers be manufactured and stocked represents a substantial burden to computer manufacturers. Each existing model, variable functional characteristic or capability of a computer represents a large number of different systems, subassemblies and components, which must be manufactured and stocked to maintain customer satisfaction. In order to permit a wide variety of functional characteristics to be implemented within a single computer system, variations in functional characteristics within such a computer system have been suggested that renders it unnecessary to physically or mechanically manipulate the respective computer system. U.S. Pat. No. 5,553,144 by Frank A. Almquist et al., assigned to International Business Corporation, Armonk, N.Y., US, filed Mar. 7, 1995, issued Sep. 3, 1996, "Method And System For Selectively Altering Data Processing System Functional Characteristics Without Mechanical Manipulation", discloses a method and system for selectively altering the functional characteristics of a data processing system without physical or mechanical manipulation. A data processing system is first manufactured having a predetermined set of functional characteristics. A multibit alterable code which includes a functional characteristic definition is then initially loaded into physically secure, nonvolatile memory within the data processing system, utilizing an existing bus, or a fusible link which may be opened after loading is complete. The functional characteristic definition is loaded from nonvolatile memory into a nonscannable register within a secure portion of a control logic circuit each time power is applied to the data processing system and the definition is then utilized to enable only selected functional characteristics. Entering a security code, which matches one of a number of preloaded codes and an encoded alternate functional characteristic definition, may thereafter selectively enable alternate functional characteristics. The alternate functional characteristic definition may be enabled on a one-time, metered, or regularly scheduled basis and variable capability data processing systems may be implemented in this manner utilizing a single manufactured system, without the necessity of manufacturing and storing multiple data processing system models.

U.S. Pat. No. 5,982,899 by Jürgen Probst, assigned to International Business Machines Corporation, Armonk, N.Y., US, filed Aug. 11, 1995, issued Nov. 9, 1999, "Method For Verifying The Configuration The Computer System" teaches a method for verification of configuration data which is expressive of the configuration of a computer system. A computer system having configuration data stored therein, further includes an identifier for uniquely identifying the computer system. A copy of the stored configuration data is encoded via an encoding method, which uses the identifier, and the encoded configuration data is encrypted via an encryption method, which uses a private key. Subsequently, the encrypted configuration data is decrypted via a decryption method using a public key producing a decrypted result. The decrypted result may either be decoded using the identifier and compared to the stored configuration data or alternatively the stored configuration data may be encoded using the identifier and compared to the decrypted result.

Such measures omitting the need of physical or mechanical manipulations of computer systems in order to modify their functional characteristics may lead to compatibility issues related to replaceable hardware units, such as I/O-cards, memory cards and graphic cards.

OBJECT OF THE INVENTION

Starting from this, the object of the present invention is to provide an improved method for alternatively activating replaceable hardware units of different types.

SUMMARY OF THE INVENTION

The foregoing object is achieved by a method as laid out in the independent claims. Further advantageous embodiments of the present invention are described in the sub claims and are taught in the following description.

According to the present invention a method is provided for alternatively activating, in a data processing system, a replaceable hardware unit of a first or a second type, providing a predetermined set of functional capabilities, whereby said data processing system is being configured to allow selectively electronically enabling of at least a subset of said functional capabilities. Initially a replaceable hardware unit is provided to the data processing system. Then, the type of the provided replaceable hardware unit gets determined. Then, if the provided replaceable hardware unit is of the first type, the subset of functional capabilities to be electronically enabled is determined and, subsequently, enabled. Alternatively, if said provided replaceable hardware unit is of the second type, the entire functional capabilities of said provided replaceable hardware unit are enabled, instead.

Preferably, an identification may be retrieved from said provided replaceable hardware unit and compared with a reference value in order to determine the type. The identification may be formed by a specific signal pattern retrieved from said provided replaceable hardware unit.

In a preferred implementation the data processing unit comprises a smart chip and the step of determining the subset of functional capabilities to be electronically enabled is performed using said smart chip. Alternatively, the data processing unit comprises encoded and encrypted configuration data and the step of determining the subset of functional capabilities to be electronically enabled is performed using said configuration data.

The above, as well as additional objectives, features and advantages of the present invention, will be apparent in the following detailed written description.

The novel features of the invention are set forth in the appended claims. The invention itself, however, as well as a preferred mode of use, further objectives, and advantages thereof, will best be understood by reference to the following detailed description of an illustrative embodiment when read in conjunction with the accompanying drawings.

DETAILED DESCRIPTION OF THE INVENTION

Figure 1:
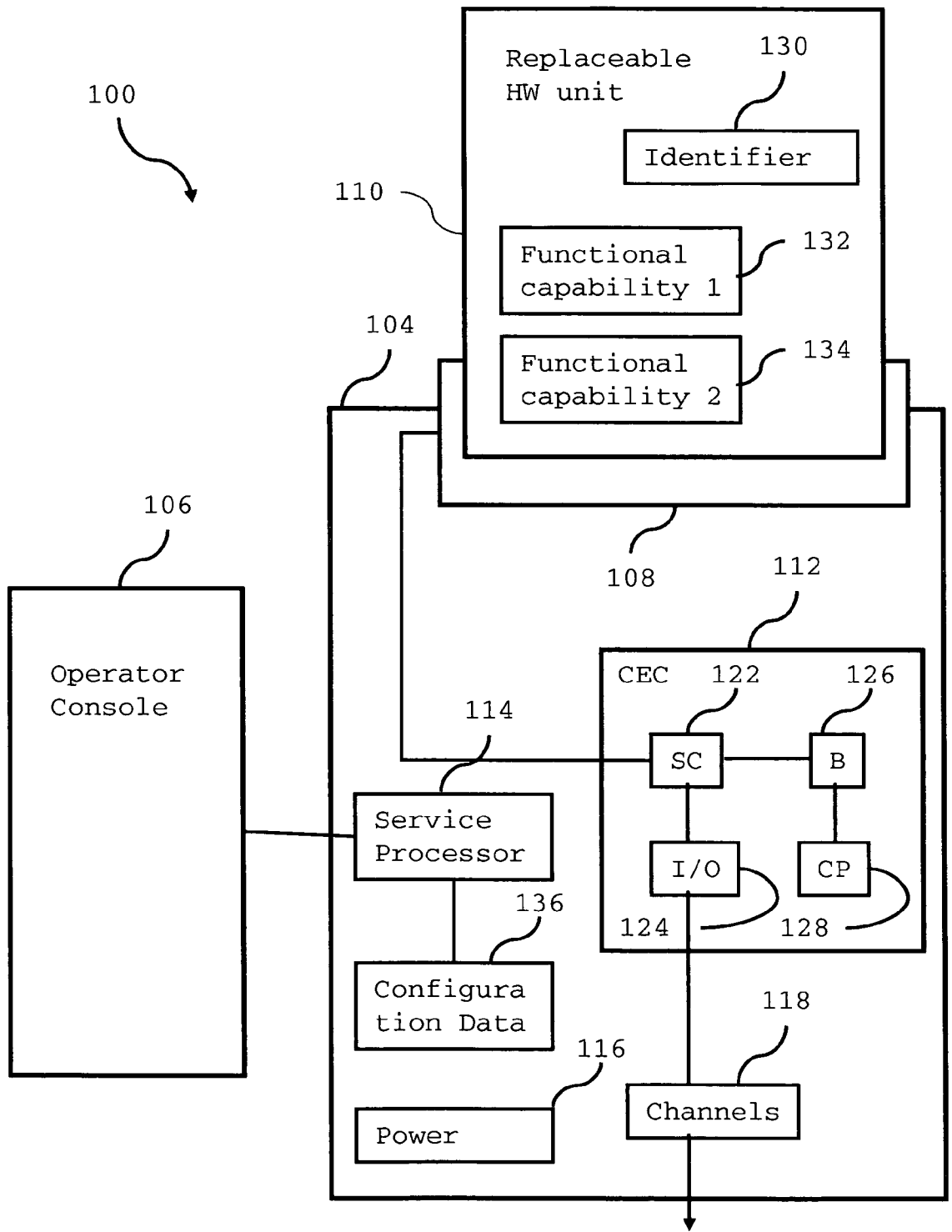
FIG. 1 shows a schematic block diagram illustrating a data processing system containing a replaceable hardware unit in accordance with the present invention, which may be utilized to implement the method of the present invention.

With reference to FIG. 1, there is depicted a schematic block diagram illustrating a data processing system 100 containing a replaceable hardware unit 110 in accordance with the present invention, which may be utilized to implement the method of the present invention. In the presented case a memory card forms the replaceable hardware unit.

As illustrated, the data processing system 100 includes a computer 104, which is coupled to an operator console 106 in a manner well known in the art. Many of the high level components within computer 104 are depicted within FIG. 1, including a portion 108 for receiving the replaceable hardware unit 110, such as a slot for receiving the memory card, which serves as the main electronic storage within computer 104, and a central electronics complex 112 is also depicted. As will be explained in greater detail herein, central electronics complex 112 may include multiple multi-chip modules which serve to perform the various functions of the central electronic complex, or alternately, central electronics complex 112 may be provided with a single high density circuit and including integrated circuit devices equivalent to several million transistors. A service processor 114 is provided and is preferably coupled between operator console 106 and central electronics complex 112 to provide access to the functions and circuitry therein. A power supply 116 and input/output channels 118 are also typically provided in such a computer system, as those skilled in the art will appreciate. Input/output channels 118 are preferably utilized to access various direct access storage devices (DASD), such as diskette or tape storage devices, or printers, terminals or similar devices.

Still referring to FIG. 1, the high level segments of central electronics complex 112 are illustrated. In a modern mainframe computer such as the International Business Machines Corporation System/390 the central electronics complex typically includes four or more multi-chip modules, which serve to address various functions within a central electronics complex. As illustrated within FIG. 1, central electronics complex 112 includes an SC module 122, which preferably serves to buffer and control the flow of data between main store realized on the replaceable unit 110, input/output module 124 and the various processors within computer 104. Input/output module 124 preferably serves to control and buffer data between input/output channels 118 and the main store in a manner well known in the art. Similarly, B module 126 is provided to buffer and control instructions and data for the processor and CP module 128 serves to execute instructions within computer 104. As those skilled in the art will appreciate, each of these multi-chip modules 122, 124, 126 and 128 constitutes a highly complex electronic module which may include more than one hundred integrated circuit devices, each equivalent to thousands or millions of transistors.

The replaceable hardware unit 110, in the present implementation forming the main store of the computer 104, includes a storage place for keeping an identifier 130, which can be read by the service processor 114 also functioning as a control unit for determining the type of the provided replaceable hardware unit. The identifier 130 may be stored as part of a memory controller chip present on the memory card. Alternatively, the identifier 130 may be retrieved via the functional path directly from the central electronic complex 112.

Different cards, e.g., cards from different manufacturers, may have different identifiers. It is acknowledged that in order to implement the present invention, one type of cards, e.g., cards from the same manufacturer preferably have the same identifier. The control unit, i.e., the service processor 114, may read out the identifier. In order to provide higher security, the control unit may alternatively be implemented in the central electronic complex and the identifier may be read out via the functional (in band) path.

The replaceable hardware unit 110 may have a plurality of functional capabilities, a first functional capability 132 and a second functional capability 134, which may selectively electronically be enabled, if the respective hardware unit 110 is particularly adapted to provide such feature. However, the present invention advantageously allows using also replaceable hardware units, which are compatible to be used with the computer 104, but which are not equipped with the feature of partially enabled functional capabilities. The functional capabilities may, in the case of a memory card, be formed by a plurality of memory portions that may individually be activated. In other words, the first functional capability 132 may implement a first memory portion and the second functional capability 134 may implement a second memory portion, which may independently be activated.

In order to correctly activate the provided functional capabilities of the replaceable hardware unit, the control unit, here formed by the service processor 114, is configured to access configuration data 136. The configuration data 136 may be kept in a data store in encoded form.

Figure 2:
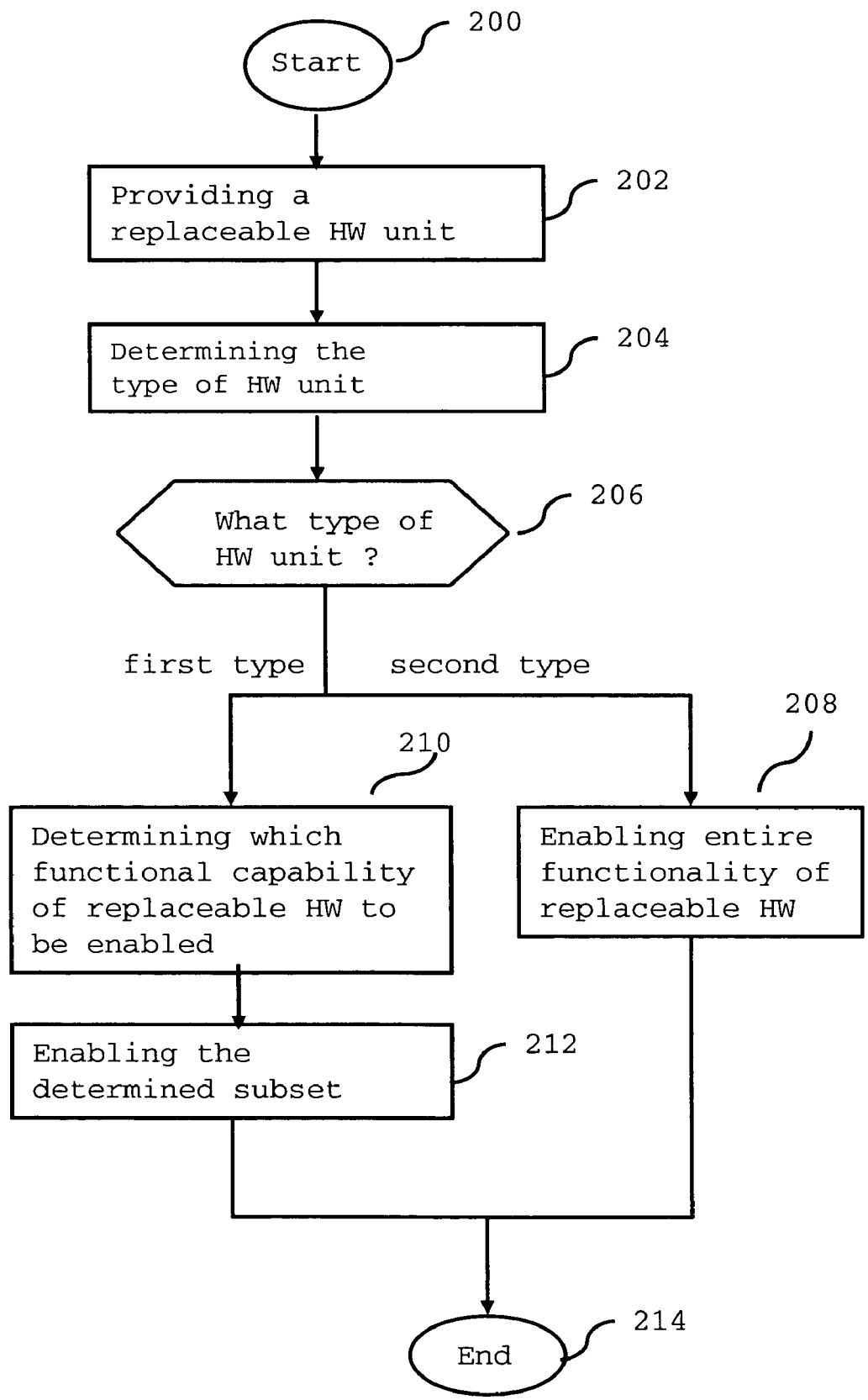
FIG. 2 shows a flow chart illustrating a method for alternatively activating a replaceable hardware unit according to the present invention.

With reference now to FIG. 2, there is depicted a flow chart illustrating a method for alternatively activating a replaceable hardware unit according to the present invention starting at block 200. Initially a replaceable hardware unit is provided (block 202), e.g., a memory card may be inserted into a respective memory card slot of a computer system. On startup of the computer system or any time during its operation the type of the hardware unit may be determined (block 204). As aforementioned, the type of the replaceable hardware unit may be dependent on the manufacturer of the unit and/or other features.

The type of the replaceable hardware unit may distinguish a first type allowing selectively electronically enabling of a subset of functional capabilities provided by the unit, and a second type of those replaceable hardware units not allowing such feature. However, the type preferably gets determined by reading out an identifier, e.g., formed by a specific signal pattern retrieved from said replaceable hardware unit.

The evaluation of the type (block 206) leads to block 208, if a second type replaceable hardware card has been determined, and to block 210, if a first type replaceable hardware card has been determined. It is acknowledged that also a first group of identifiers may correspond to the first type and a second group of identifiers different from those of the first group may correspond to the second type.

For all replaceable hardware of the second type the entire functionality is enabled (block 208). For all replaceable hardware of the first type, however, it is determined which functional capability of replaceable hardware is to be enabled.

This may, e.g., be done as described in U.S. Pat. No. 5,553,144 or U.S. Pat. No. 5,982,899, which are incorporated herewith by reference.

According to the teaching of U.S. Pat. No. 5,553,144 a data processing system is first manufactured having a predetermined set of functional characteristics. A multibit alterable code which includes a functional characteristic definition is then initially loaded into physically secure, nonvolatile memory within the data processing system, utilizing an existing bus, or a fusible link which may be opened after loading is complete. The functional characteristic definition is loaded from nonvolatile memory into a nonscannable register within a secure portion of a control logic circuit each time power is applied to the data processing system and the definition is then utilized to enable only selected functional characteristics. Entering a security code, which matches one of a number of preloaded codes and an encoded alternate functional characteristic definition, may thereafter selectively enable alternate functional characteristics. The alternate functional characteristic definition may be enabled on a one-time, metered, or regularly scheduled basis and variable capability data processing systems may be implemented in this manner utilizing a single manufactured system, without the necessity of manufacturing and storing multiple data processing system models.

Alternatively, this functionality may be implemented in accordance with the teaching of U.S. Pat. No. 5,982,899, according to which data that is expressive of the configuration of a computer system is encrypted during manufacturing of the computer system. Using an identifier, which is assigned to the computer system or a component thereof during manufacturing, does this. The manufacturer of the computer system only knows the private key, which is used for the encryption of the encoded data. The RSA cryptosystem preferably is used for encryption of the encoded data. For encoding the data by means of the identifier, the identifier can for example simply be added to the data. For decoding the identifier is subtracted later on from the encoded data. Also the DES method can be used whereby the identifier of the computer system is employed as a secret key.

The encrypted data can be stored in any kind of storage device of the computer system, for example on an EPROM or on a diskette. The encrypted data can already be stored in the computer system during manufacturing. However, it is also possible to transmit the encrypted data to the computer system via a telephone line, ISDN or other telecommunication means when the computer system is already installed at the customer.

Once the encrypted data is stored on a storage device of the computer system, the encrypted data is used for verifying the configuration. This serves to protect the computer system against unauthorized changes of its configuration. This can be a requirement for technical reasons or can serve as asset protection for the manufacturer of the computer system. The first step for verifying the configuration is to receive the encrypted data. This is accomplished by reading the encrypted data from the storage device of the computer system on which the encrypted data has been stored during manufacturing or by receiving the encrypted data via a telecommunications link directly from the manufacturer. Thereafter the encrypted data is decrypted, preferably using a public key of the RSA cryptosystem. This yields the decoded data, which has been encoded by means of the identifier. The identifier is available in the computer system, preferably in electronically readable form.

In order to prevent the cloning of the computer system with another computer system having another identifier, the identifier has to be unchangeable. If the private and the public key match and if the same identifier is used for the encoding and decoding of the data then this yields the data, which is expressive of the configuration of the computer system stored during manufacturing. The configuration data of the computer system is also stored on a storage device of the computer system in unencoded form. These configuration data are compared to the decoded data. If there is a match between the decoded data and the unencoded configuration data this means that the customer is authorized to use this configuration of the computer system.

Preferably, this method for verifying of the configuration is carried out by means of microcode every time the computer system is booted. Alternatively, it is also possible to encode the configuration data, which is stored in an encoded form in the computer system and to compare the encoded data with the encoded configuration data.

Finally, the determined subset of functional capabilities, such as the amount of memory present on a memory card, is enabled (block 212), before the method ends (block 214).

The present invention can be realized in hardware, software, or a combination of hardware and software. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

The invention claimed is:

1. A method for selectively electronically enabling functional capabilities in a data processing system, the method comprising the steps of:
   providing a replaceable hardware unit to said data processing system,
   determining a type of the provided replaceable hardware unit,
   determining a subset of functional capabilities to be electronically enabled and electronically enabling the determined subset of functional capabilities, if said provided replaceable hardware unit is of a first type, and
   enabling an entire functional capabilities of said provided replaceable hardware unit if said provided replaceable hardware unit is of a second type.

2. The method according to claim 1, wherein the step of determining the type of the provided replaceable hardware unit includes the steps of:
   retrieving an identification from said provided replaceable hardware unit and comparing said identification with a reference value.

3. The method according to claim 2, wherein said identification comprises a specific signal pattern retrieved from said provided replaceable hardware unit.

4. The method according to claim 2, wherein said replaceable hardware unit comprises a memory card.

5. The method according to claim 4, wherein said memory card comprises a memory controller chip and said identification is read out by a service processor via a central electronic complex.

6. The method according to claim 1, wherein said data processing system comprises a smart chip and the step of determining the subset of functional capabilities to be electronically enabled includes using said smart chip.

7. The method according to claim 1, wherein said data processing system comprises an encoded and encrypted configuration data and the step of determining the subset of functional capabilities to be electronically enabled includes using said configuration data.

* * * * *